United States Patent
Luo

(10) Patent No.: US 10,831,853 B2
(45) Date of Patent: Nov. 10, 2020

(54) METHOD AND DEVICE FOR EXHIBITION PROCESS OF NETWORK DATA

(71) Applicant: BEIJING JINGDONG SHANGKE INFORMATION TECHNOLOGY CO., LTD., Beijing (CN)

(72) Inventor: Jinsong Luo, Beijing (CN)

(73) Assignee: BEIJING JINGDONG SHANGKE INFORMATION TECHNOLOGY CO., LTD., Beijing (CN)

( * ) Notice: Subject to any disclaimer, the term of this patent is extended or adjusted under 35 U.S.C. 154(b) by 265 days.

(21) Appl. No.: 15/536,768

(22) PCT Filed: Dec. 9, 2015

(86) PCT No.: PCT/CN2015/096759
§ 371 (c)(1),
(2) Date: Jun. 16, 2017

(87) PCT Pub. No.: WO2016/095733
PCT Pub. Date: Jun. 23, 2016

(65) Prior Publication Data
US 2017/0344658 A1    Nov. 30, 2017

(30) Foreign Application Priority Data
Dec. 16, 2014 (CN) .......................... 2014 1 0782604

(51) Int. Cl.
*G06F 7/00* (2006.01)
*G06F 16/957* (2019.01)
(Continued)

(52) U.S. Cl.
CPC ........ *G06F 16/9574* (2019.01); *G06F 16/951* (2019.01); *G06F 16/955* (2019.01); *G06F 16/958* (2019.01)

(58) Field of Classification Search
CPC ......... G06F 17/30902; G06F 17/30864; G06F 17/30876; G06F 16/9574; G06F 16/951; G06F 16/955; G06F 16/958
(Continued)

(56) References Cited

U.S. PATENT DOCUMENTS

| 2006/0059107 A1* | 3/2006 | Elmore ................. G06Q 10/06 705/64 |
| 2011/0078054 A1* | 3/2011 | Saito ..................... G06Q 30/00 705/27.1 |

(Continued)

FOREIGN PATENT DOCUMENTS

| CN | 102591954 A | 7/2012 |
| CN | 103530160 A | 1/2014 |

(Continued)

OTHER PUBLICATIONS

International Search Report with English translation and Written Opinion for Application No. PCT/CN2015/096759 dated Feb. 26, 2016 (10 pages).

(Continued)

*Primary Examiner* — Md I Uddin
(74) *Attorney, Agent, or Firm* — Michael Best & Friedrich LLP

(57) ABSTRACT

The present application discloses a method and device for exhibition process of network data. The method comprises: acquiring codes of a data list frame of a corresponding page and index identifiers of various pieces of data, after receiving a page exhibition request for network data; exhibiting the data list frame on a current page according to the codes of the data list frame; sending respectively query requests to a background data unit in an asynchronous mode, according to the index identifiers of the various pieces of data, in order to query respectively detailed data corresponding to each of the index identifiers, and exhibiting respectively the queried (Continued)

201

Acquiring codes of a data list frame of a corresponding page and index identifiers of various pieces of data, after receiving a page exhibition request for network data; exhibiting the data list frame on a current page according to the codes of the data list frame;

202

Sending respectively query requests to a background data unit in an asynchronous mode, according to the index identifiers of the various pieces of data, in order to query respectively detailed data corresponding to each of the index identifiers, and exhibiting respectively the queried detailed data in positions of a data list corresponding to the index identifiers detailed data in positions of a data list corresponding to the index identifiers. By means of the present invention, hardware cost can be reduced, and the data response speed is improved.

6 Claims, 5 Drawing Sheets

(51) Int. Cl.
G06F 16/951 (2019.01)
G06F 16/955 (2019.01)
G06F 16/958 (2019.01)

(58) Field of Classification Search
USPC .............................. 707/722, 723, 758, 999.1
See application file for complete search history.

(56) References Cited

U.S. PATENT DOCUMENTS

| | | |
|---|---|---|
| 2013/0073401 A1 | 3/2013 | Cook |
| 2015/0088693 A1* | 3/2015 | Moore ............... G06Q 30/0627 |
| | | 705/26.61 |

FOREIGN PATENT DOCUMENTS

| | | |
|---|---|---|
| CN | 103699378 A | 4/2014 |
| CN | 103853716 A | 6/2014 |
| CN | 104462455 A | 3/2015 |
| JP | H09-305473 A | 11/1997 |
| JP | 2000-250841 A | 9/2000 |
| JP | 2006-092186 A | 4/2006 |
| JP | 2009-187280 A | 8/2009 |
| JP | 2013-105459 A | 5/2013 |
| RU | 2500026 C2 | 11/2013 |
| WO | 2014/126069 A | 8/2014 |

OTHER PUBLICATIONS

Indonesia Patent Office Action for Application No. P00201703769 dated Jan. 24, 2020 (4 pages, English translation included).
Russia Patent Office Action for Application No. 2017124972/08 dated Jul. 24, 2018 (11 pages, English translation included).
Japan Patent Office Action for Application No. 2017-531361 dated May 22, 2018 (5 pages).

* cited by examiner

METHOD AND DEVICE FOR EXHIBITION PROCESS OF NETWORK DATA

Cross-Reference to Related Applications

This application is a national stage filing under 35 U.S.C. 371 of International Application No. PCT/CN2015/096759 filed Dec. 9, 2015, which claims the foreign priority benefit of Chinese Patent Application No. 201410782604.6 filed Dec. 16, 2014, which are incorporated by reference herein in their entireties.

TECHNICAL FIELD

The present invention relates to the technical field of processing network data, and especially to a method and a device for exhibition process of network data.

BACKGROUND ART

Nowadays, with the popularization of network, article exhibition and transaction systems based on intelligence devices (for example, computers, smartphones and tablet computers) and communication networks are rapidly developing, and the tendency is to conduct actions of shopping and selling through the internet.

In a website system for implementing article exhibitions and transactions, it will inevitably relate to exhibitions of various data lists, e.g., commodity lists, searching lists, order lists and sales statistics list, etc, for both the Web applications at foregrounds and the backgrounds. However, these data lists which are seemingly simple may converge exhibitions of lots of fields (the field may also be called as the head of a list) of data, and the background servers need to associate many data lists for fusion query. For such a processing, the processing speed is acceptable when the amount of data accessing is small, while once the amount of concurrence accesses significantly increases, a severe processing bottleneck will be caused, which directly leads to several cases like slow or stuck response of the webpage and refused-response of browsers.

In view of the aforesaid technical problems, solutions in the prior arts mainly employ data buffering at the background servers.

FIG. 1 is a processing flowchart according to the solution in the prior art. Referring to FIG. 1, main contents of the prior art include a background server pre-reading a database, buffering data in the database in a memory of the background server, querying data from the data buffered in the memory of the background server when a data list request is received from the foreground, thereby improving the query speed.

However, the aforesaid solution in the prior art has the following disadvantages:

1) Although the prior art substantially solves the problem of data processing at the background server, it is impossible to buffer all the data in the databases at the background, and there is a problem that delay presents in updating synchronization, which may cause data to be inaccurate;

2) In the prior art, it needs to buffer huge data in the memory of a background server and needs a huge storage capacity of the memory, thus a great hardware cost support is required and the hardware cost is high;

3) The problem of simultaneous exhibition for big data of the webpages being slow is not solved, the foreground browsers need to exhibit large amount of information while the background servers are in the course of assembly and transmission, which leads to slow response of the webpages and subjects to refuse response especially on the clients with poor performances and low configuration of browsers;

4) Not all the data can be buffered in the memory at the server end, e.g., statistics data like number of order and sales volume, this renders that server end will respond rather slowly when a great number of data are queried at one time. Even if data warehouses and other techniques are adopted, only the pressure on the primary database is reduced, and there is no obvious improvement on the speed, and time for responding to request from the backend is still long; and 5) the speed of responding is slow when a large amount of data is exhibited on the page at one-time, which directly leads to a loss of large number of users due to the experience.

To sum up, the main disadvantages of the prior art are high hardware cost and slow data response speed.

SUMMARY OF THE INVENTION

In view of this, the main object of the present invention is to provide a method and a device for exhibition process of network data, in order to reduce the hardware cost and improve the data response speed.

The technical solution of the present invention is realized as follows:

A method for exhibition process of network data, comprising:

acquiring codes of a data list frame of a corresponding page and index identifiers of various pieces of data after a page display request for network data is received; displaying the data list frame on a current page according to the codes of the data list frame;

respectively sending query requests to a background data unit according to the index identifiers of the various pieces of data using an asynchronous mode, to respectively query detailed data corresponding to each of the index identifiers, and respectively displaying the queried detailed data in positions of the data list corresponding to the index identifiers.

In a preferred embodiment, the method further comprises:

caching locally the displayed detailed data and the corresponding index identifiers in a terminal;

acquiring codes of a data list frame of a corresponding page and index identifiers of various pieces of data after a page display request for the same network data is received again; displaying the data list frame on a current page according to the codes of the data list frame;

respectively querying corresponding detailed data locally from the terminal according to the index identifiers of the various pieces of data, and respectively displaying the detailed data queried locally from the terminal in positions of the data list corresponding to the index identifiers.

In a preferred embodiment, the method further comprises:

caching locally the displayed detailed data and the corresponding index identifiers in a terminal;

acquiring codes of a data list frame of a corresponding page and index identifiers of various pieces of data after a page display request for network data is received; displaying the data list frame on a current page according to the codes of the data list frame;

respectively querying corresponding detailed data locally from the terminal according to the index identifiers of the various pieces of data, and respectively displaying the detailed data queried locally from the terminal in positions of the data list corresponding to the index identifiers; for index identifiers of which corresponding detailed data are not queried locally from the terminal, respectively sending query requests to the background data unit again to respectively query detailed data corresponding to the index identifiers and display the queried detailed data in positions of the data list corresponding to the index identifiers.

In a preferred embodiment, after displaying the data list frame on a current page, further comprising: caching the displayed data list frame, retaining the cached data list frame on the current page and acquiring index identifiers of various pieces of data of a new page after a request for page-turning of the current page is received, respectively querying corresponding detailed data according to the index identifiers of the various pieces of data, and respectively displaying the queried detailed data in positions of the data list corresponding to the index identifiers.

In a preferred embodiment, the step of acquiring index identifiers of various pieces of data of a new page specifically comprises:

calculating locally a number of a new page at the terminal, sending to a background an index identifier query request carrying the number of the new page, and the background querying index identifiers of various pieces of data of the new page based on the number of the new page; receiving a query result returned from the background.

A network data display processing device, characterized by comprising:

a first loading module, used for acquiring codes of a data list frame of a corresponding page and index identifiers of various pieces of data after a page display request for network data is received, and displaying the data list frame on a current page according to the codes of the data list frame;

a second loading module, used for respectively sending query requests to a background data unit according to the index identifiers of the various pieces of data using an asynchronous mode, to respectively query detailed data corresponding to each of the index identifiers, and respectively displaying the queried detailed data in positions of the data list corresponding to the index identifiers.

In a preferred embodiment, the device further comprises:

a detailed data caching module, used for caching locally the displayed detailed data and the corresponding index identifiers in a terminal;

a third loading module, used for acquiring codes of a data list frame of a corresponding page and index identifiers of various pieces of data after a page display request for the same network data is received again, displaying the data list frame on a current page according to the codes of the data list frame, and triggering a fourth loading module;

the fourth loading module, used for respectively querying corresponding detailed data locally from the terminal according to the index identifiers of the various pieces of data, and respectively displaying the detailed data queried locally from the terminal in positions of the data list corresponding to the index identifiers.

In a preferred embodiment, the device further comprises:

a detailed data caching module, used for caching locally the displayed detailed data and the corresponding index identifiers in a terminal;

a fifth loading module, used for acquiring codes of a data list frame of a corresponding page and index identifiers of various pieces of data after a page display request for network data is received; displaying the data list frame on a current page according to the codes of the data list frame, and triggering a sixth loading module;

the sixth loading module, used for respectively querying corresponding detailed data locally from the terminal according to the index identifiers of the various pieces of data, and respectively displaying the detailed data queried locally from the terminal in positions of the data list corresponding to the index identifiers; for index identifiers of which corresponding detailed data are not queried locally from the terminal, respectively sending query requests to the background data unit again to respectively query detailed data corresponding to the index identifiers and display the queried detailed data in positions of the data list corresponding to the index identifiers.

In a preferred embodiment, the device further comprises:

a frame caching module, used for caching the displayed data list frame;

a first module for new-page loading, used for retaining the cached data list frame on a current page and acquiring index identifiers of various pieces of data of a new page after a request for page-turning of the current page is received;

a second module for new-page loading, used for respectively querying corresponding detailed data according to the index identifiers of the various pieces of data, and respectively displaying the queried detailed data in positions of the data list corresponding to the index identifiers.

In a preferred embodiment, the first module for new-page loading is further used for calculating locally a number of a new page at the terminal, sending to a background an index identifier query request carrying the number of the new page, and the background querying index identifiers of various pieces of data of the new page based on the number of the new page; receiving a query result returned from the background.

Compared with the prior art, after a page display request for network data is received, since it first queries index identifiers of various pieces of data and codes of a data list frame, and the background server has rapid query speed and extremely small transmission amount, the data list is almost instantly displayed on a screen of a user terminal, nearly not feeling a delay and improving the data response speed. Secondly, data in each line in the data list are loaded separately and asynchronously, each query request is queried at the background, with an index identifier, the computing processing time of the background server will become rather short, and thus compared with the prior art, the network transmitted data volume is greatly reduced, the transmission time will become rather short and the data response speed is improved. Moreover, the present invention carries out the caching operation of great data volume without occupying the memory of the background server, greatly saving the hardware cost of the background server.

EMBODIMENTS

The present invention is further illustrated below with reference to the Drawings and embodiments.

Figure 1:
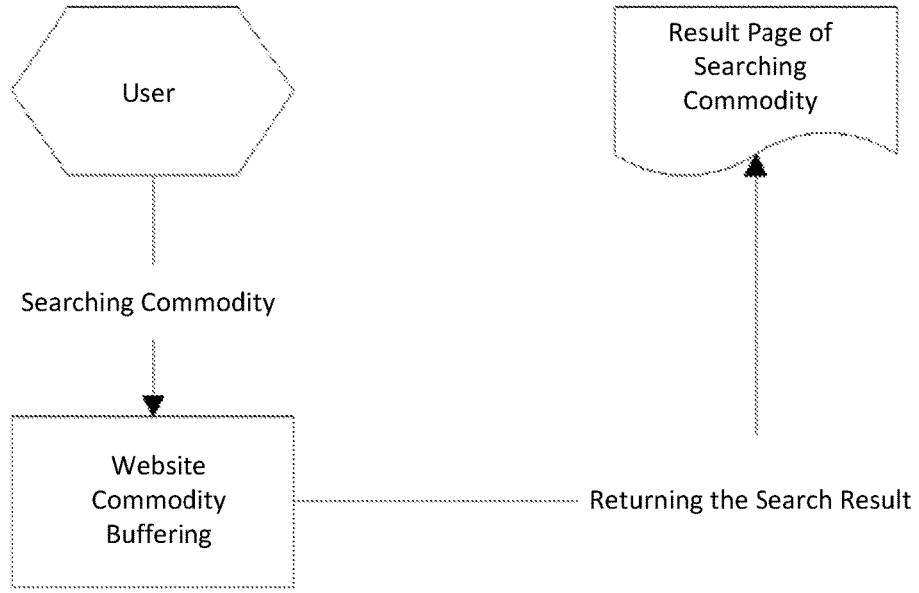
FIG. 1 is a flowchart according to the processing of the solution in the prior art.
Figure 2:
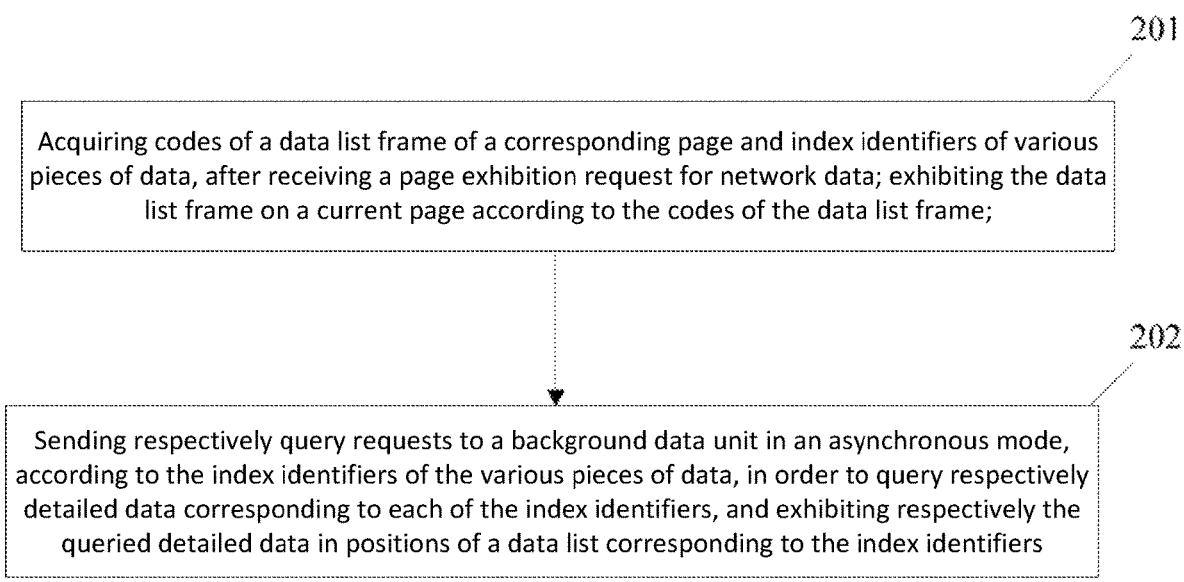
FIG. 2 is a flowchart of a method for exhibition process of network data according to the present invention.

FIG. 2 is a flowchart of a method for exhibition process of network data according to the present invention, the method mainly comprises:

Step 201: acquiring codes of a data list frame of a corresponding page and index identifiers (index IDs) of various pieces of data, after a page exhibition request for network data is received; exhibiting the data list frame on a current page according to the codes of the data list frame;

Step 202: sending respectively query requests to a background data unit in an asynchronous mode, e.g., databases and data files, according to the index identifiers of the various pieces of data, in order to query respectively detailed data corresponding to each of the index identifiers, and exhibiting respectively the queried detailed data in positions of a data list corresponding to the index identifiers.

In step 201, the expression "a page exhibition request for network data is received" usually refers to receive a request for loading page, a request for querying network data, etc. The network data may be any network data needed to be displayed, e.g., data of commodity list, including commodity identifiers (IDs), commodity names, models, prices, origins, manufacturers and sales volume, etc; as another example, data of users' orders, including order identifiers (order numbers), time, payment states, shipment states and details of the orders, etc; and as another example, data of user lists, including user identifiers (IDs), user names, states of the users and activity levels, etc.

The expression "a data list frame of a corresponding page" refers to the data list frame of a page requested by the page display request. The data list frame indicates a template of a page of a HyperText Mark-up Language (HTML) list. The codes of the data list frame may be parsed from the webpage codes of the corresponding page. The foreground system, e.g., a client or browser, may load and exhibit the style of the corresponding data list frame on a foreground screen according to the codes of the data list frame, e.g., such page elements as the color, the style and the background of the data list. After the data list frame is loaded and exhibited, detailed data corresponding to various pieces of data can be queried according to each of index identifiers of the various pieces of data, and the detailed data having been queried are displayed in the data list frame.

The index identifiers of various pieces of data in the data list may be, for example, commodity identifiers, order identifiers, and user identifiers. The specific type of the index identifiers may be determined according to the request type corresponding to the requested page. In a particular embodiment, corresponding index identifier may be firstly queried according to specific instructions of the page display request.

For example, if the page display request is a request for exhibiting details of commodities, a commodity identifier conforming to the query condition is queried from the database according to the query condition submitted by the request such as the category of the commodity, the price range or region etc., and is taken as an index identifier corresponding to various pieces of data in a data list to be exhibited. Since only the commodity identifier rather than detailed data of the various pieces of data is acquired, only the data list frame is displayed in step 201, and the detailed data therein such as the commodity name, model, price, origin, manufacturer and sales volume corresponding to the commodity identifier, will be displayed after being queried in subsequent step 202.

If the page exhibition request is a request for exhibiting order details of a certain user, the history order number of a user account is queried in the database according to the user account submitted by the request, and the order number is taken as an index identifier corresponding to various pieces of data in a data list to be displayed. Since only the order number rather than detailed data of the various pieces of data is acquired, only the data list frame is displayed in step 201, and the detailed data therein such as time, payment state, shipment state and details of the order corresponding to the order will be displayed after being queried in subsequent step 202.

After the index identifiers of various pieces of data in the data list are queried, in step 202, an asynchronous mode can be employed and detailed data of the background can be circularly request by using ajax asynchronization according to the index identifiers on each line, each piece of detailed data is displayed once returned, until the circulation ends, then the list is displayed completely. During the query, the index identifier is the primary key of query. The asynchronous mode means respectively querying detailed data corresponding to each of the index identifiers from the background, i.e., each of the index identifiers will trigger a query request to the background once. The query request for each of the index identifiers is unnecessary to be executed synchronously or in a strict order, the query requests corresponding to the index identifiers are independent from each other. Once the detailed data of a certain index identifier are queried, the detailed data of the index identifier would be exhibited in the position of the data list corresponding to the index identifier.

By means of the technical solution of the present invention, after a page exhibition request for network data is received, for example, after a request for searching and querying data of a certain service list is received from a user, since index identifiers of various pieces of data and codes of a data list frame are firstly queried, i.e., the aforesaid step 201, the query speed of background server is fast and the amount of transmission is extremely small, thereby the data list is almost instantly displayed on a screen of a user terminal, without a delay being felt, thus improving the data response speed. Secondly, data in each line of the data list are loaded independently and asynchronously, i.e., in step 202, each query request is queried at the background with an index identifier, the computing processing time of the background server will become rather short. The interactive webpage application techniques such as the ajax, flash Plug-ins and iframe technique may be adopted for each request, a request for only carrying data (for example, adopting a JSON data structure) is sent to a background server, and data responses returned from the background server do not include HTML codes, and thus compared with the prior art, the network transmitted data volume is greatly reduced, the transmission time will become rather short and the data response speed is improved. Moreover, the present invention carries out the buffering operation of great data volume without occupying the memory of background server, which greatly saves the hardware cost of the background server.

Besides, during step 202, the user may observe that data keep loaded dynamically on the page, a piece of detailed data is displayed instantly once it is queried, and the user would immediately see the piece of detailed data. The dynamic page enables a user to really feel the whole process of loading detailed data and feel that the background system is working hard to serve him/her. In this way, the circumstances of slow and stuck pages caused by one-time exhibition of big data on a webpage are completely avoided, instead friendly user experience would be presented. As user experience, excellent and fast exhibition of data list may contribute for a user to find desired target information faster, and excessive human-machine operations used for finding the desired target information as well as waste of resources would be reduced. For example, a user may directly find the desired commodity information fast, which may be directly converted into orders, and contribute to the revenue and public praise of commercial websites.

Further, since the data list frame is pre-loaded on the page and each line of data are dynamically refreshed onto the frame according to the return of the index identifiers, separation and decoupling of list frame and data exhibited inside thereof is completed, which is beneficial for labor division of development and maintenance for program. Since data list frame is only a template (including the header and data line), all the contents of the data list are dynamically generated circularly according to the number of items that can be displayed on the current page. This saves the amount of HTML codes of the whole list and improves the network transmission speed.

In a preferred embodiment, the method disclosed in the present invention further comprises: buffering locally the displayed detailed data and the corresponding index identifiers in a terminal, wherein the terminal is a browser or a local device of a client; acquiring codes of a data list frame and index identifiers of various pieces of data of a corresponding page, after a page exhibition request for the network data which is the same as that in step 201 is received again; exhibiting the data list frame on a current page according to the codes of the data list frame; querying corresponding detailed data locally from the terminal according to the index identifiers of the various pieces of data respectively; and exhibiting the detailed data locally queried from the terminal in positions of the data list corresponding to the index identifiers respectively. By such processing, it may realize that for the browsed data list page, the detailed data will be buffered locally at the terminal by the browser, such that the page can be displayed directly, when a browsing occurs repeatedly, there is no need to access the background server again, which reduces the pressure of the background server and further improves the display speed.

For example, in case that lists are ranked by price and sales volume, etc., since the index identifiers (the primary-key number of commodity) of each of the commodities are firstly obtained, looking up in the locally buffered data at the current browser end can be performed by using these index identifiers. If the detailed data corresponding to the index identifiers can be found, those detailed data can be directly loaded and displayed. In this manner, there is no need to send to the back end a request for detailed contents of the current line in the list, thereby the speed would be improved and amount of network accesses and the pressure of the server would be reduced.

The aforesaid embodiment only relates to the data list page which has been browsed, in which local buffering is performed when same page is browsed, so that the browsing speed is improved. In another preferred embodiment, according to the present invention, the exhibited detailed data and the corresponding index identifiers are buffered locally in a terminal. No matter what kind of page exhibition request for network data is received, e.g., the page display request may be a request for search for a channel or commodity model, or a browsing request, codes of a data list frame of a corresponding page and index identifiers of various pieces of data will be acquired. According to the codes of the data list frame, the data list frame is exhibited on the current page. According to the index identifiers of the various pieces of data, corresponding detailed data are queried locally respectively from the terminal and the detailed data queried locally from the terminal are exhibited respectively in positions of the data list corresponding to the index identifiers. For those index identifiers of which corresponding detailed data are not queried locally from the terminal, query requests are sent respectively to the background data unit again to respectively query detailed data corresponding to the index identifiers, and then the queried detailed data are displayed respectively on the positions in the data lists corresponding to the index identifiers.

By means of the aforesaid processing, the present invention may buffer locally in the terminal the corresponding index identifiers and corresponding detailed data of all the displayed or browsed detailed data of the data list. No matter in which channel or commodity model the user searches or browses, it firstly searches locally in the terminal directly using the index identifiers of data in the data list in the page needed to the displayed. Once there are locally buffered detailed data in the terminal, they can be exhibited fast. This enhances the experience of accessing the website and reduces the pressure of the server.

In a further embodiment of the present invention, search identifiers of data clicked by the user on the exhibited data list are also be recorded. For example, when a user clicks data of a certain commodity, corresponding commodity id will be recorded. Then the commodity id will be locally buffered in the terminal, and signed with a browsed mark. When the exhibited page is displayed again, based on the search identifiers of various pieces of data, query on whether the search identifier has a browsed mark is performed locally in the terminal. If so, a label showing that the commodity has been browsed is signed on the displayed detailed data, thereby shopping experience is improved.

In a further embodiment of the present invention, after the data list frame is exhibited on the current page, the embodiment may further comprise buffering the exhibited data list frame. After a request for page-turning the current page is received, the buffered data list frame is maintained on the current page, and index identifier of each of various pieces of data on the new page is acquired. According to the index identifier of each of the various pieces of data, corresponding detailed data (as described in the aforesaid embodiment, this query may be performed on the background, or can be performed locally firstly on the buffer of the terminal, and then on the background if the query is unsuccessful) are queried. Then, the queried detailed data are exhibited on the positions of data list corresponding to the index identifiers respectively. By means of such processing, when a request for page-turning is received, it is unnecessary to circularly regenerate a data list frame according to codes of a data category frame, which further improves the speed for processing and exhibition.

In the embodiment of the present invention, the step of acquiring index identifiers of various pieces of data of a new page specifically comprises: calculating locally a page number of a new page at the terminal, sending to a background an index identifier query request carrying the page number of the new page, and querying index identifiers of various pieces of data of the new page based on the number of the new page by the background; receiving a query result returned from the background. For example, for clicking on a previous page, a following page or a page with certain number, Jascript can be used for performing page number maintenance of the current page in a browser, e.g., when the first page is displayed, is 1, and when the next page is clicked, the page number of the page maintained directly plus one. When a request is sent to the back end, the index identifier can be queried by carrying directly the calculated page number of the new page, thereby saving the page number calculation at the background and improving the processing efficiency.

Figure 3:
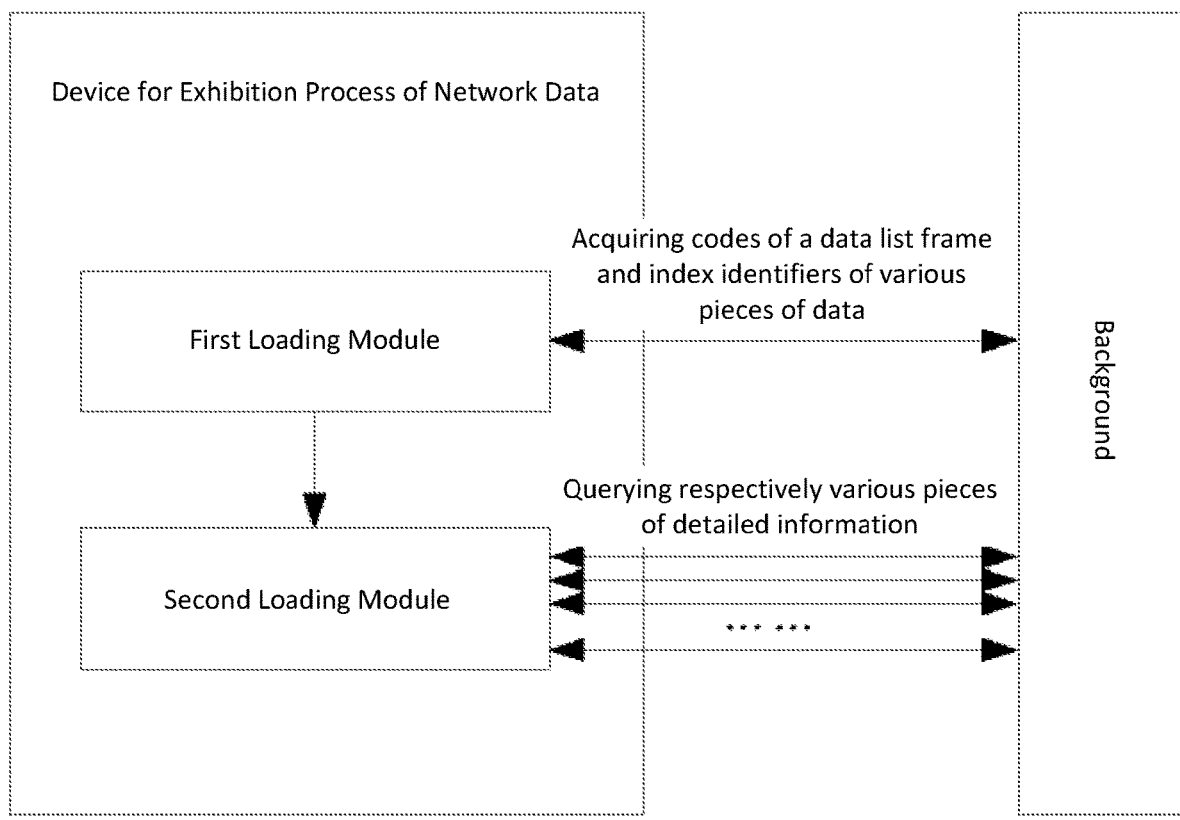
FIG. 3 is a composition diagram of an embodiment of a device for exhibition process of network data according to the present invention.

Corresponding to the aforesaid method, the present invention further discloses a device for exhibition process of network data for executing the aforesaid method. FIG. 3 is a composition diagram of an embodiment of a device for exhibition process of network data according to the present invention. Referring to FIG. 3, the device may be disposed in the foreground system, and specifically comprises:

a first loading module for acquiring codes of a data list frame of a corresponding page and index identifiers of various pieces of data (specifically acquiring from the background), after a page exhibition request for network data is received, and exhibiting the data list frame on a current page according to the codes of the data list frame;

a second loading module for sending respectively query requests to a background data unit (for example, databases and data files) according to the index identifiers of the various pieces of data in an asynchronous mode, in order to respectively query detailed data corresponding to each of the index identifiers, and respectively exhibiting the queried detailed data in positions of a data list corresponding to the index identifiers.

Figure 4:
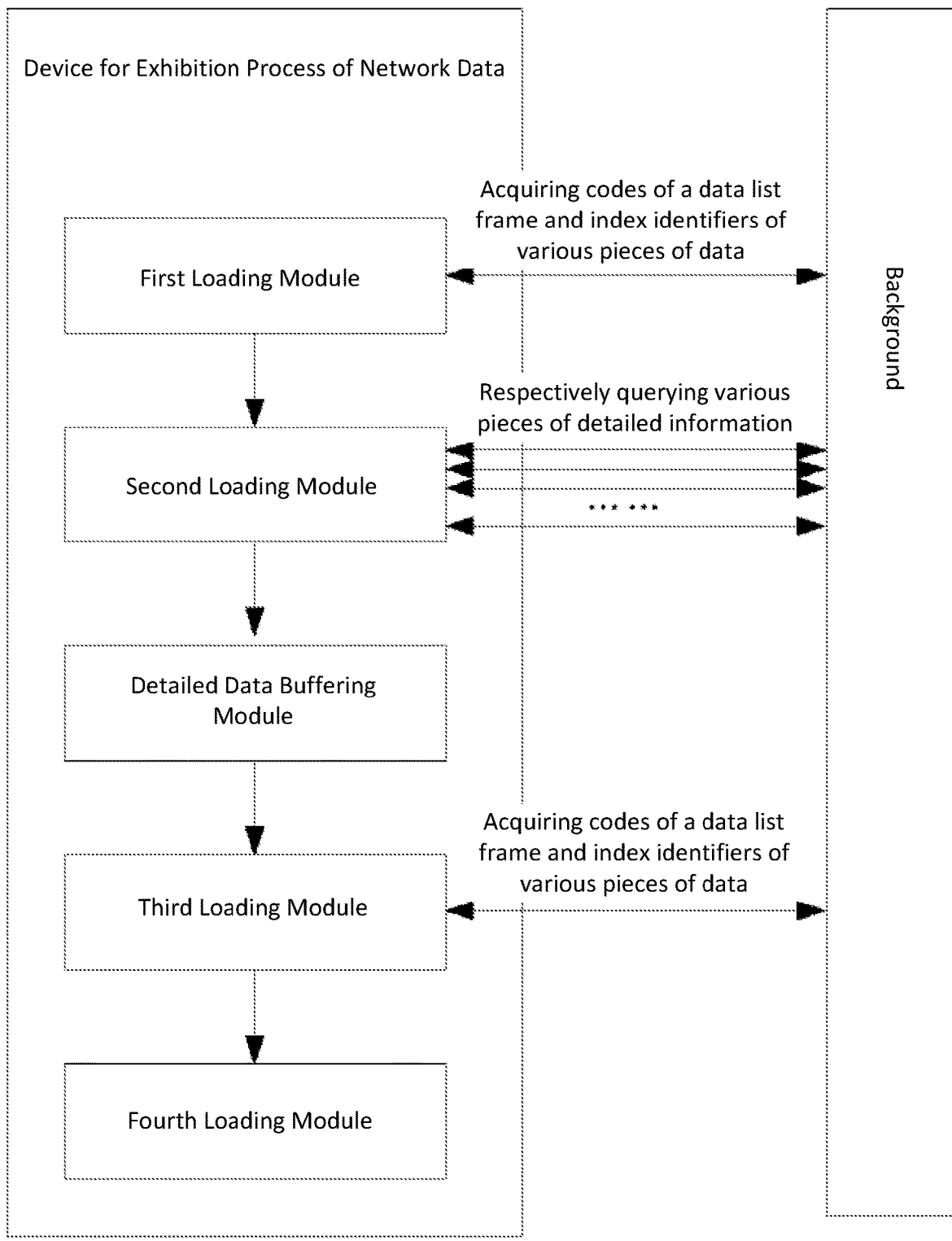
FIG. 4 is a composition diagram of another embodiment of a device for exhibition process of network data according to the present invention.

FIG. 4 is a composition diagram of another embodiment of a device for exhibition process of network data according to the present invention. Referring to FIG. 4, the device further comprises:

a detailed data buffering module for buffering locally the exhibited detailed data and the corresponding index identifiers in a terminal;

a third loading module for acquiring codes of a data list frame and index identifiers of various pieces of data of a corresponding page, after a page exhibition request for the same network data is received again, exhibiting the data list frame on a current page according to the codes of the data list frame, and then triggering a fourth loading module;

the fourth loading module for querying corresponding detailed data locally from the terminal according to the index identifiers of the various pieces of data respectively, and exhibiting the detailed data locally queried from the terminal in positions of the data list corresponding to the index identifiers respectively.

By means of the embodiment of FIG. 4, it may be realized that for the data list page browsed, the browser will locally buffer the detailed data at the terminal. When a browsing occurs repeatedly, there is no need to access the background server again, and the page can be displayed directly, which reduces the pressure of the background server and further improves the display speed.

Figure 5:
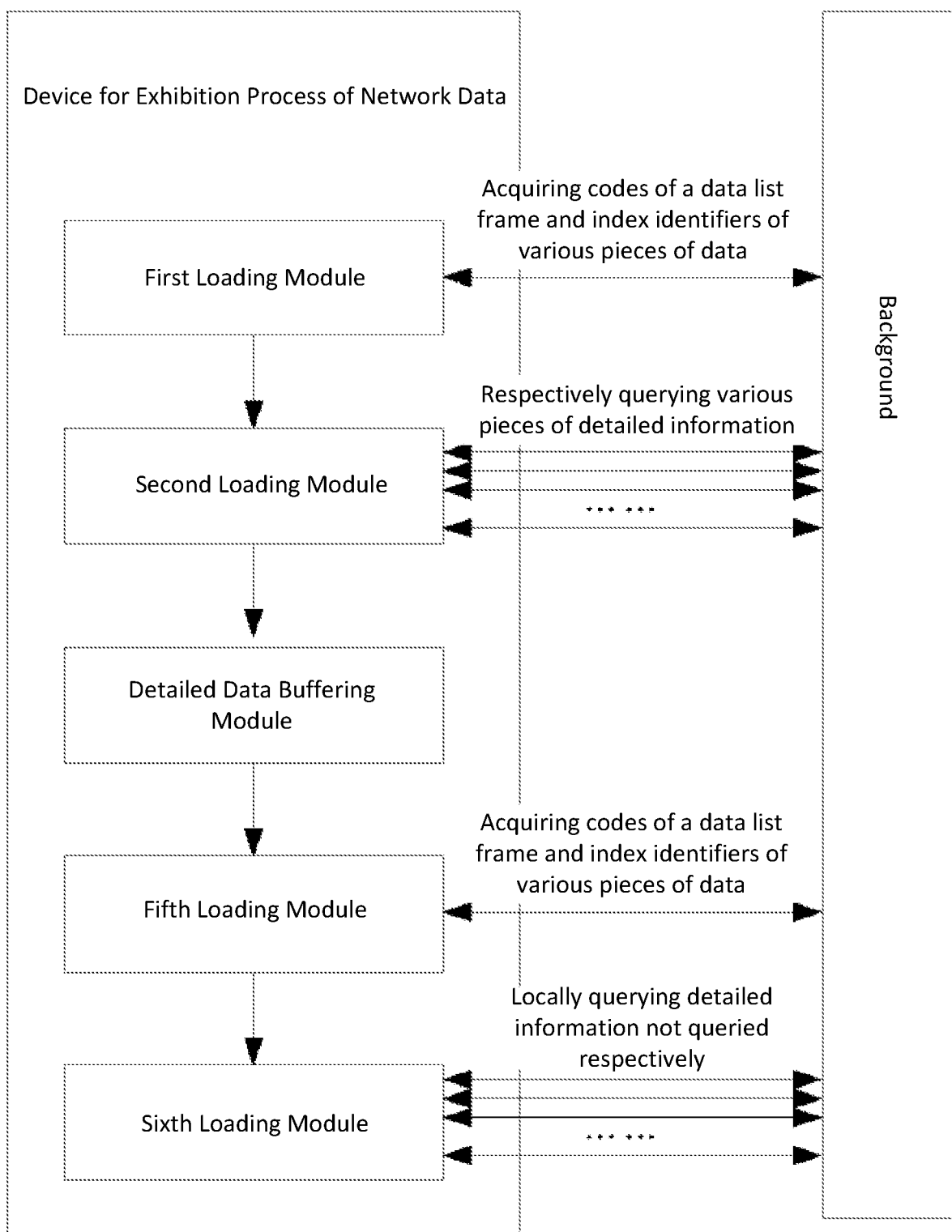
FIG. 5 is a composition diagram of another embodiment of a device for exhibition process of network data according to the present invention.

FIG. 5 is a a composition diagram of another embodiment of a device for exhibition process of network data according to the present invention. Referring to FIG. 5, the device further comprises:

a detailed data buffering module for locally buffering exhibited detailed data and the corresponding index identifiers in a terminal;

a fifth loading module for acquiring codes of a data list frame of a corresponding page and index identifiers of various pieces of data, after a page exhibition request for network data is received; exhibiting the data list frame on a current page according to the codes of the data list frame, and triggering a sixth loading module;

the sixth loading module for respectively querying locally corresponding detailed data from the terminal according to the index identifiers of the various pieces of data, and exhibiting respectively the detailed data queried locally from the terminal in positions of the data list corresponding to the index identifiers. For those index identifiers of which corresponding detailed data are not queried locally from the terminal, query requests are sent respectively to the background data unit again to respectively query detailed data corresponding to the index identifiers, and then the queried detailed data are exhibited respectively on the positions of the data lists corresponding to the index identifiers.

By means of the embodiment of FIG. 5, the present invention may buffer locally in the terminal the corresponding index identifiers and corresponding detailed data of all the displayed or browsed detailed data of the data list. No matter in which channel or commodity model the user searches or browses, it firstly searches locally in the terminal directly using the index identifiers of data in the data list in the page needed to the displayed. Once there are locally buffered detailed data in the terminal, they can be exhibited fast. This enhances the experience of accessing the website and reduces the pressure of the server.

Figure 6:
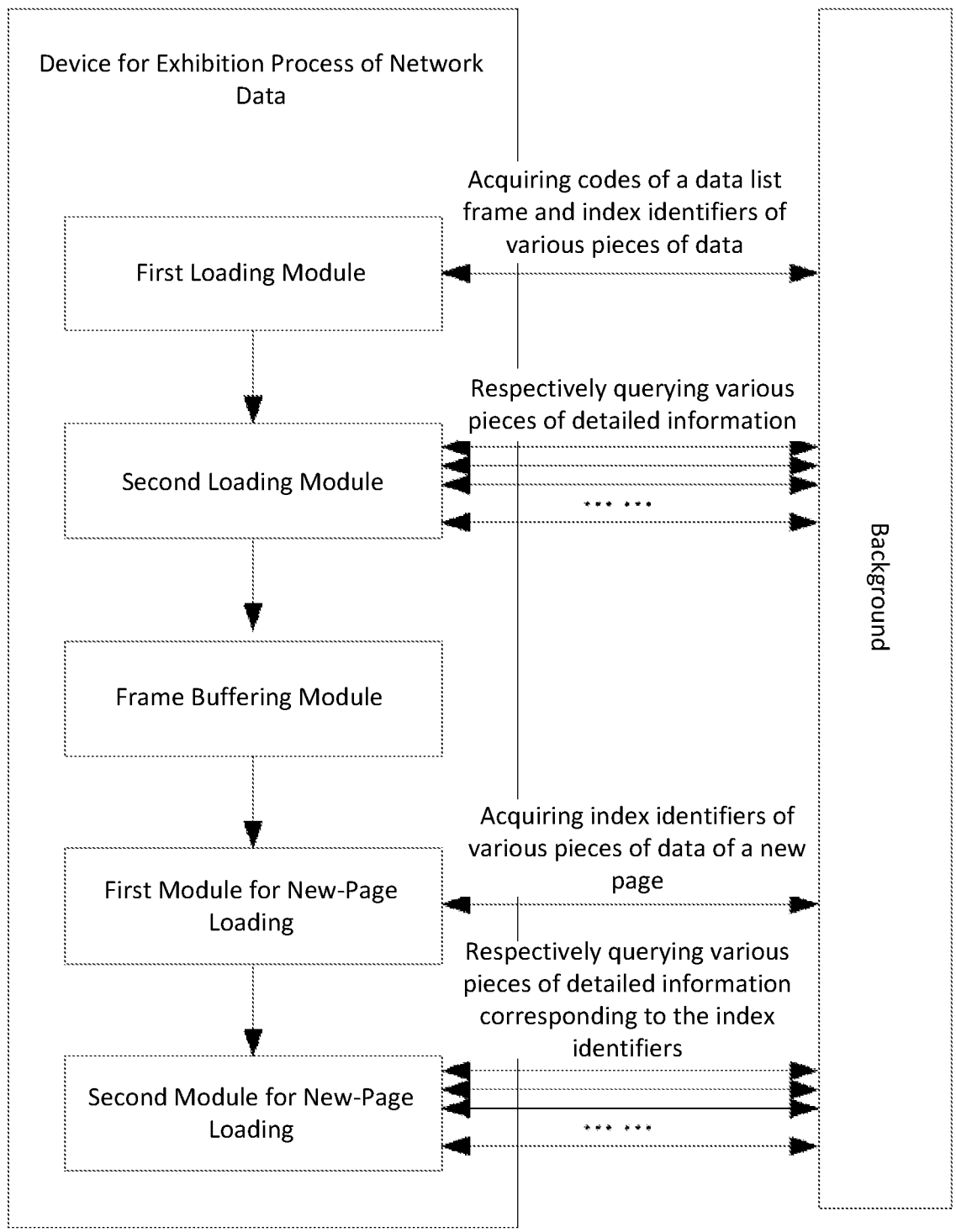
FIG. 6 is a composition diagram of another embodiment of a device for exhibition process of network data according to the present invention.

FIG. 6 is a composition diagram of another embodiment of a device for exhibition process of network data according to the present invention. Referring to FIG. 6, based on any of the aforesaid embodiments, the device further comprises:

a frame buffering module for buffering the exhibited data list frame;

a first module for new-page loading for maintaining the buffered data list frame on a current page and acquiring index identifier of each of various pieces of data of a new page after a request for page-turning the current page is received;

a second module for new-page loading for querying corresponding detailed data respectively according to the index identifier of each of the various pieces of data, and exhibiting respectively the queried detailed data on the positions of data list corresponding to the index identifiers.

In the embodiment of the present application, the first module for new-page loading is further used for calculating locally a page number of a new page at the terminal, sending to a background an index identifier query request carrying the page number of the new page, and querying index identifiers of various pieces of data of the new page based on the number of the new page at the background; receiving a query result returned from the background.

As described in the above, by adopting a technique for batching detailed data in a manner of page indexing and the asynchronization, the technical solution of the present invention may finally solve the problems of slow speed and poor experience of Big-Data list exhibition on big data-category websites, e.g., E-commerce websites, realize fast and friendly page loading and exhibition, improve the user experience, and reduce the bottleneck pressure caused by a one-time request to the background server.

Moreover, function modules in each of the embodiments in the present invention may be all integrated into one processing unit, or present physically separately, or two or more modules are integrated into one unit. The aforesaid integrated unit can be implemented either in the form of hardware or of a software function unit. The function modules in each of the embodiments may either be located at a terminal or a network node, or be distributed across a plurality of terminals or network nodes.

Moreover, each of the embodiments in the present invention may be implemented through data processing programs executed by data processing devices such as computers. Obviously, the data processing programs constitute the present invention. Besides, data processing programs stored in a storage medium are usually executed by directly reading the programs from the storage medium or installing or copying the programs to a storage device, e.g., a hard disk and/or a memory, of a data processing device. Therefore, such storage medium also constitutes the present invention. The storage medium may use any type of recording mode, for example, a paper storage medium such as a paper belt, a magnetic storage medium such as a floppy disk, a hard disk or a flash memory, an optical storage medium such as a CD-ROM, and a magnetic-optical storage medium such as an MO.

Therefore, the present invention also discloses a storage medium in which data processing programs are stored, and the data processing programs are applied for executing any of the embodiments of the aforesaid method in the present invention.

In addition, the method steps of the present invention can be realized either through data processing programs or hardware, for example, a logic gate, a switch, an application-specific integrated circuit (ASIC), a programmable logic controller and an embedded microcontroller. Therefore, such hardware capable of realizing the method of the present invention may also constitute the present invention.

The aforesaid embodiments are just preferred embodiments of the present invention, and not used for limiting the present invention. Any amendment, equivalent replacement and improvement falling within the spirit and principle of the present invention shall be included in the protection scope of the present invention.

The invention claimed is:

1. A method for exhibition process of network data, characterized in that the method comprises:
    acquiring codes of a data list frame of a corresponding page after receiving a page exhibition request for network data and querying index identifiers of various pieces of data according to the page exhibition request;
    exhibiting only the data list frame on a current page according to the acquired codes of the data list frame without exhibiting detailed data corresponding to the index identifiers;
    sending respectively query requests to a background data unit in an asynchronous mode, according to the queried index identifiers of the various pieces of data in order to query respectively detailed data corresponding to each of the index identifiers, and exhibiting respectively the queried detailed data in positions of a data list corresponding to the index identifiers,
    wherein a specific type of the index identifiers is determined according to a request type corresponding to a requested page, wherein the data list frame of the corresponding page refers to the data list frame of a page requested by a page display request, and the codes of the data list frame is parsed from webpage codes of the corresponding page; and
    after exhibiting the data list frame on the current page, buffering the exhibited data list frame, maintaining the buffered data list frame on the current page and acquiring an index identifier of each of various pieces of data of a new page after receiving a request for page-turning the current page, querying corresponding detailed data respectively according to the index identifier of each of the various pieces of data of the new page, and exhibiting respectively the queried detailed data corresponding to each of the index identifiers of each of the various of pieces of data of the new page on the positions of the data list corresponding to the index identifiers of the various pieces of data of the new page,
    wherein the step of acquiring the index identifier of each of the various pieces of data of the new page comprises:
    calculating locally a page number of the new page at a terminal, sending to a background an index identifier query request carrying the page number of the new page, and querying the index identifiers of the various pieces of data of the new page based on the number of the new page at the background; and
    receiving a query result returned from the background.

2. The method according to claim 1, characterized in that the method further comprises:
    buffering the exhibited detailed data and the corresponding index identifiers in a terminal locally;
    acquiring codes of a data list frame and index identifiers of various pieces of data of a corresponding page, after receiving a page exhibition request for the same network data again; exhibiting the data list frame on a current page according to the codes of the data list frame; and
    querying respectively corresponding detailed data locally from the terminal according to the index identifiers of the various pieces of data, and exhibiting respectively the detailed data locally queried from the terminal in positions of the data list corresponding to the index identifiers.

3. The method according to claim 1, characterized in that the method further comprises:
    locally buffering the exhibited detailed data and the corresponding index identifiers in the terminal;
    acquiring codes of a data list frame of a corresponding page and index identifiers of various pieces of data, after receiving a page exhibition request for network data; exhibiting the data list frame on a current page according to the codes of the data list frame;
    querying locally respectively corresponding detailed data from the terminal according to the index identifiers of the various pieces of data, and exhibiting respectively the detailed data queried locally from the terminal in positions of the data list corresponding to the index identifiers; for those index identifiers of which corresponding detailed data are not queried locally from the terminal, query requests are sent respectively to the background data unit again, in order to respectively query detailed data corresponding to the index identifiers, and then the queried detailed data are exhibited respectively on the positions of the data lists corresponding to the index identifiers.

4. A device for exhibition process of network data, characterized in that the device comprises:
    a first loading module configured to acquire codes of a data list frame of a corresponding page after receiving a page exhibition request for network data, query index identifiers of various pieces of data according to the page exhibition request, and exhibit only the data list frame on a current page according to the codes of the data list frame without exhibiting detailed data corresponding to the index identifiers;

a second loading module configured to send respectively query requests to a background data unit in an asynchronous mode, according to the queried index identifiers of the various pieces of data, in order to query respectively detailed data corresponding to each of the index identifiers, and exhibit respectively the queried detailed data in positions of a data list corresponding to the index identifiers, wherein a specific type of the index identifiers is determined according to a request type corresponding to a requested page, wherein the data list frame of the corresponding page refers to the data list frame of a page requested by a page display request, and the codes of the data list frame is parsed from webpage codes of the corresponding page;

a frame caching module configured to buffer the exhibited data list frame;

a first module for new-page loading configured to maintain the buffered data list frame on the current page and acquire index identifier of each of various pieces of data of a new page after receiving a request for page-turning the current page; and a second module for new-page loading configured to query corresponding detailed data respectively according to the index identifier of each of the various pieces of data of the new page, and exhibit respectively the queried detailed data corresponding to each of the index identifiers of each of the various of pieces of data of the new page on the positions of the data list corresponding to the index identifiers of the various pieces of data of the new page, wherein the first module for new-page loading is further configured to, after receiving the request for page-turning the current page, calculate locally a page number of the new page at a terminal, send to a background an index identifier query request carrying the page number of the new page, and query index identifiers of various pieces of data of the new page based on the number of the new page at the background; receive a query result returned from the background.

5. The device according to claim 4, characterized in that the device further comprises:

a detailed data buffering module configured to buffer the exhibited detailed data and the corresponding index identifiers in a terminal locally;

a third loading module configured to acquire codes of a data list frame and index identifiers of various pieces of data of a corresponding page, after receiving a page exhibition request for the same network data again; exhibit the data list frame on a current page according to the codes of the data list frame, and trigger a fourth loading module;

the fourth loading module configured to query respectively corresponding detailed data locally from the terminal according to the index identifiers of the various pieces of data, and exhibit respectively the detailed data locally queried from the terminal in positions of the data list corresponding to the index identifiers.

6. The device according to claim 4, characterized in that the device further comprises:

a detailed data buffering module configured to locally buffer the exhibited detailed data and the corresponding index identifiers in the terminal;

a fifth loading module configured to acquire codes of a data list frame of a corresponding page and index identifiers of various pieces of data, after receiving a page exhibition request for network data, exhibit the data list frame on a current page according to the codes of the data list frame, and trigger a sixth loading module;

the sixth loading module configured to locally query respectively corresponding detailed data from the terminal according to the index identifiers of the various pieces of data, and exhibit respectively the detailed data queried locally from the terminal in positions of the data list corresponding to the index identifiers; for those index identifiers of which corresponding detailed data are not queried locally from the terminal, query requests are sent respectively to the background data unit again, in order to respectively query detailed data corresponding to the index identifiers, and then the queried detailed data are exhibited respectively on the positions of the data lists corresponding to the index identifiers.

* * * * *